United States Patent [19]

Kemp

[11] Patent Number: 4,861,460

[45] Date of Patent: Aug. 29, 1989

[54] HYDROTREATING WITH WIDE-PORE HYDROGEL-DERIVED CATALYSTS

[75] Inventor: Richard A. Kemp, Stafford, Tex.

[73] Assignee: Shell Oil Company, Houston, Tex.

[21] Appl. No.: 84,778

[22] Filed: Aug. 13, 1987

Related U.S. Application Data

[62] Division of Ser. No. 924,228, Oct. 28, 1986, Pat. No. 4,717,706.

[51] Int. Cl.$^4$ ............................................... C10G 45/08
[52] U.S. Cl. ..................... 208/216 PP; 208/251 H; 208/254 H
[58] Field of Search ............ 502/210, 211, 213; 423/628; 208/216 R, 216 RP, 251 H, 254 H

[56] References Cited

U.S. PATENT DOCUMENTS

| | | | |
|---|---|---|---|
| 2,894,900 | 7/1959 | Hemminger | 208/135 |
| 3,124,418 | 3/1964 | Malley et al. | 23/143 |
| 3,520,654 | 7/1970 | Carr et al. | 23/143 |
| 3,798,176 | 3/1974 | Ao | 252/437 |
| 3,864,461 | 2/1975 | Miller et al. | 423/628 |
| 3,879,310 | 4/1975 | Rigge et al. | 252/435 |
| 3,897,365 | 7/1975 | Feins et al. | 252/435 |
| 3,969,273 | 7/1976 | Brown et al. | 252/435 |
| 4,003,828 | 1/1977 | Eberly, Jr. | 208/251 H |
| 4,019,978 | 4/1977 | Miller et al. | 502/211 |
| 4,066,572 | 1/1978 | Choca | 252/437 |
| 4,154,812 | 5/1979 | Sanchez et al. | 423/626 |
| 4,202,798 | 5/1980 | Johnson et al. | 252/437 |
| 4,534,852 | 8/1985 | Washecheck et al. | 208/251 H |
| 4,588,706 | 5/1986 | Kukes et al. | 502/211 |
| 4,624,938 | 11/1986 | Kemp | 502/208 |
| 4,629,716 | 12/1986 | Kemp | 502/208 |
| 4,629,717 | 12/1986 | Chao | 502/210 |

Primary Examiner—Paul E. Konopka
Attorney, Agent, or Firm—Pamela J. McCollough

[57] ABSTRACT

Hydrotreating with wide port-containing catalysts prepared by incorporating a metals solution containing an element selected from the group consisting of molybdenum, tungsten and mixtures thereof, and an element selected from the group consisting of nickel, cobalt and mixtures thereof, into a phosphated alumina hydrogel support. The final calcined catalysts have surface areas greater than about 300 m$^2$/g, crush strengths greater than about 9 lbs and more than about 20% of their pores greater than 150 Å.

61 Claims, No Drawings

HYDROTREATING WITH WIDE-PORE HYDROGEL-DERIVED CATALYSTS

This is a division of application Ser. No. 924,228, filed Oct. 28, 1986, now U.S. Pat. No. 4,717,706.

FIELD OF THE INVENTION

This invention relates to a process for preparing high surface area, wide pore-containing phosphated alumina hydrogel-derived catalysts.

BACKGROUND OF THE INVENTION

In the catalytic processing of petroleum feedstocks, it is often desirable to alter the pore structure of the catalyst in order to accommodate different types of feeds. For example, when processing feedstocks with no metals or with a low metals content, it may be technically and economically desirable to use narrow-pore catalysts. On the other hand, when processing feedstocks of high metals content, the metals tend to deposit rapidly on the catalyst surface and plug the pores of conventional hydroprocessing catalyst, resulting in a loss of catalytic activity for sulfur and nitrogen removal. In order to maintain hydrotreating activity, it is necessary that the catalyst be high in surface area. To facilitate the diffusion of large components into and out of the catalyst and to prevent surface deposits of coke and metals, large pore diameters are required. These criteria necessitate the use of wide pore-containing catalysts which have high surface areas and a significant fraction of large pores. The large pores allow enhanced diffusion of large molecules into the catalyst while the smaller pores, providing most of the surface area, allow for hydroprocessing of the feed. Methods for creating controlled pore sizes and aluminas are hence quite useful.

SUMMARY OF THE INVENTION

The present invention relates to a process for the preparation of high surface area, wide pore-containing catalysts containing an element selected from the group consisting of molybdenum, tungsten and mixtures thereof, and an element selected from the group consisting of nickel, cobalt and mixtures thereof, into an alumina/aluminum phosphate hydrogel-derived support. The catalyst is prepared by a process which comprises:

(a) titrating an aqueous solution of an acid aluminum salt and an aqueous solution of a basic aluminum compound in the presence of a phosphorus-containing compound in a heel containing a solution of about 15%v to about 50%v of an alcohol selected from the group consisting of methanol, ethanol and mixtures thereof, thereby forming a precipitate, (b) aging the precipitate at a temperature ranging from about 20° C. to about 90° C. for at least about 15 minutes at a pH ranging from about 9.0 to about 12.0, (c) washing the precipitate, (d) mixing the precipitate with a solution containing solubilized salts of a heavy metal selected from the group consisting of molybdenum, tungsten and mixtures thereof, and an element selected from the group consisting of nickel, cobalt and mixtures thereof, at a pH in the range between about 4.0 and about 8.0 and a temperature in the range between about 20° C. and about 90° C. until adsorption of the metal salts onto the gel is sufficient to yield a final catalyst having a catalytically effective amount of metals present, (e) extruding the product of step (d), and (f) drying and calcining the product of step (e) at a temperature ranging from about 300° C. to about 900° C.

It has been found that when alcohol is added as co-solvent during the precipitation step, the finished catalysts have a much broader pore size distribution than catalysts prepared using water as the heel during precipitation. The catalysts prepared according to the invention have high surface areas, greater than about 300 $m^2/g$; high crush strengths, greater than about 9 (lbs), and substantial portions, greater than about 20%, of their pores greater than 150 Å. These catalysts are quite useful for hydrotreating and hydrodemetallization applications.

DESCRIPTION OF THE PREFERRED EMBODIMENTS

In the process of the instant invention, a high surface area, wide pore-containing phosphated alumina hydrogel-derived catalyst is prepared by incorporating a metals solution containing an element selected from the group consisting of molybdenum, tungsten and mixtures thereof, and an element selected from the group consisting of nickel, cobalt and mixtures thereof, into a phosphated alumina hydrogel support prepared by titrating an aqueous solution of an acid aluminum salt and a phosphorus-containing compound with an aqueous solution of a basic aluminum compound in a heel containing a solution of about 15 to about 50% by volume of an alcohol selected from the group consisting of methanol, ethanol and mixtures thereof.

The phosphated alumina hydrogel can be prepared by titrating an aqueous solution of one or more aluminum salt(s) with an appropriate acidic or basic material or solution in the presence of a phosphorus-containing compound to cause precipitation of the phosphated alumina gel. One skilled in the art will recognize that the alumina gel can be prepared by titrating an acidic aluminum salt such as, for example, aluminum sulfate, aluminum nitrate or aluminum chloride, in aqueous solution with a basic precipitating medium such as, for example, sodium hydroxide or ammonium hydroxide, in the presence of a phosphorus-containing compound, or, by titrating an alkali metal aluminate such as, for example, sodium aluminate or potassium aluminate, in aqueous solution with an acidic precipitating medium such as, for example, hydrochloric acid or nitric acid, in the presence of a phosphorus-containing compound. One skilled in the art will recognize that the adjustment of the pH of an aluminum-containing solution to between about 5.5 and about 10.0 will result in precipitation of the aluminum as aluminum hydroxide or hydrated aluminum oxide.

In a preferred embodiment, the phosphated alumina hydrogel is prepared by titrating in a heel solution containing about 15%v to about 50%v, preferably about 20%v to about 40%v of an alcohol selected from the group consisting of methanol, ethanol and mixtures thereof, an aqueous solution of an alkali metal aluminate and an aqueous solution of acid aluminum salt in the presence of a phosphorus-containing compound to cause precipitation of the phosphated alumina gel. Suitable acidic aluminum salts include aluminum sulfate, aluminum nitrate and aluminum chloride. A preferred species is aluminum chloride. Suitable alkali metal aluminates are sodium aluminate and potassium aluminate. The precipitation can be carried out by adding an aqueous solution of the basic aluminum species to an aqueous solution of the acidic aluminum species present in the alcohol-containing heel, or the procedure can be reversed by adding the solution of the acidic aluminum species to the solution of the basic aluminum species present in the alcohol-containing heel (referred to as "sequential precipitation"). Preferably, the precipitation in the instant invention is carried out by simultaneously adding the acid aluminum species and the basic aluminum species, at least one of which has a phosphorus-containing compound dissolved therein, to the alcohol-containing heel to cause precipitation of the hydrogel (referred to as "simultaneous precipitation").

As used herein, the term "a phosphorus-containing compound" is generic and refers to one phosphorus-containing compound as well as more than one phosphorus-containing compound. The phosphorus-containing compound is generally selected from the group consisting of phosphoric acid, a phosphate salt and mixtures thereof. Suitable phosphate salts include alkali metal phosphate, alkali metal hydrogen phosphate, ammonium phosphate and ammonium hydrogen phosphate. The phosphorus-containing compound is preferably phosphoric acid and is preferably mixed with the acid aluminum species prior to the precipitation. Alternatively, the phosphorus-containing compound can be sodium or ammonium phosphate and mixed with the basic aluminum species prior to precipitation. The phosphorus-containing compound can also be added as a separate solution or added to both the acid aluminum species and the basic aluminum species without significantly affecting the results. In a preferred embodiment, the phosphorus-containing compound is prepared using commercially available 85% phosphoric acid although other phosphorus-containing materials may be utilized. The amount of phosphorus-containing compound added to the acid aluminum species and/or the basic aluminum species is from about 0.06 to about 0.30 moles of phosphorus per mole of aluminum.

Alcohols suitable for use in the heel solution during the precipitation step are methanol, ethanol and mixtures thereof, with ethanol being preferred. The amount of alcohol present in the heel during the precipitation step ranges from about 15%v to about 50%v, preferably about 20%v to about 40%v. While the alcohol is present during precipitation of the hydrogel, the phosphated alumina supports themselves are not affected by the presence of the alcohol. However, after a reslurry treatment with the metal solutions, the finished catalysts have much broader pore-size distributions than their counterparts prepared using only water as a heel.

The temperature and pH of the precipitation are important variables in the preparation of the instant aluminas needed to produce desirable physical qualities in the catalysts. Changes in precipitation temperatures and pHs result in changes in porosities. In the instant invention, a precipitation temperature typically ranges from about 20° C. to about 90° C., and preferably from about 50° C. to about 85° C., and a precipitation pH typically ranges from about 5.5 and about 10.0, preferably from about 5.5 and about 8.0, and more preferably between about 6.0 and about 7.5. The length of time required for the precipitation step is not critical. However, the maximum rate of addition of the acid aluminum species and the basic aluminum species is fixed by the rate at which the two streams can be mixed and the pH and temperature of the system can be effectively controlled.

After the precipitaton step is completed, the pH of the slurry is adjusted by the addition of the basic aluminate solution to fall in the range from about 9.0 to about 12.0, preferably about 10.0 to about 11.5, and aged at a temperature in the range from about 20° C. to about 90° C., preferably about 50° C. to about 85° C. for at least about 15 minutes. An upper limit on the length of time for aging is not critical and is normally determined by economical considerations. Aging times will typically range from about 0.1 to about 10 hours, preferably from about 0.25 to about 5 hours, and more preferably from about 0.25 to about 1 hour. In general, aluminas with acceptable properties are produced by holding the aging temperature equal to the precipitation temperature.

After aging, the slurry is washed and filtered in routine fashion to remove substantially all the salts formed during the precipitation of the hydrogel which can be removed by washing. The preferred solvent for washing is water although other solvents such as lower alkanols may be utilized.

After washing, the hydrogel is reslurried with a solution containing solubilized salts of a heavy metal selected from the group consisting of molybdenum, tungsten and mixtures thereof, and an element selected from the group consisting of nickel, cobalt and mixtures thereof, sufficient to deposit on the final catalyst from about 1%w to about 5%w nickel and/or cobalt and from about 8%w to about 18%w molybdenum or about 10%w to about 32%w tungsten. When mixtures of molybdenum and tungsten are utilized, the final catalyst contains about 8%w to about 32% w molybdenum and/or tungsten. Alternatively, the solution may contain amounts of nickel and/or cobalt and molybdenum and/or tungsten in excess of that required to deposit the aforsaid amounts of metals, which excess may be removed by washing following the reslurry step. A typical solution can be prepared by combining a molybdenum solution with a nickel and/or cobalt solution. In a preferred embodiment, the solution contains a stabilizing amount of phosphorus. Typically, the metals solution contains a phosphorus-containing compound an amount of phosphorus in the range from about 0.2 to about 1.5 moles of phosphorus per mole of molybdenum and/or tungsten. The phosphorus-containing compound is generally selected from the group consisting of phosphoric acid, a phosphate salt and mixtures thereof.

The molybdenum solution consists of a water-soluble source of molybdenum such as ammonium heptamolybdate or ammonium dimolybdate dissolved in water. Hydrogen peroxide may also be used to aid in solution preparation in some cases. A preferred method for preparing the molybdenum solution consists of adding hydrogen peroxide to the solution in the range of about 0.1 to about 1.0 mole of hydrogen peroxide per mole of molybdenum. Optionally, a suitable soluble amine compound such as monoethanolamine, propanolamine or ethylene diamine may be added to the molybdenum solution in order to aid in stabilization of the solution.

The tungsten solution typically consists of ammonium metatungstate dissolved in water. A preferred method for preparing the tungsten solution consists of adding hydrogen peroxide to the solution in the range of about 0.1 to about 1.0 mole of hydrogen peroxide per mole of tungsten. In addition, a suitable soluble amine compound such as monoethanolamine, propanolamine or ethylenediamine may be added to the tungsten solution in order to aid in stabilization of the solution.

The nickel solution consists of nickel salts dissolved in water and optionally, a phosphorus-containing compound. A wide range of nickel compounds are suitable, such as nickel nitrate, nickel acetate, nickel formate, nickel sulfate, nickel oxide, nickel phosphate, nickel carbonate, nickel chloride, and nickel hydroxide. Two compounds that are especially useful are nickel nitrate and nickel carbonate.

The cobalt solution consists of cobalt salts dissolved in water and optionally, a phosphorus-containing compound. A wide range of cobalt compounds are suitable, such as cobalt nitrate, cobalt hydroxide, cobalt acetate, cobalt oxalate, or cobalt oxide. The preferred cobalt compound is cobalt nitrate.

The reslurry of the hydrogel support with the metals solution is carried out at a pH in the range between about 4.0 and about 8.0, preferably between about 4.0 and about 6.0, adjusting to these pH ranges by adding, if necessary, acid or base to the hydrogel, the metals solution and/or the mixture of the slurry and the metals solution, and a temperature in the range between about 20° C. and about 90° C. until adsorption of the metals salts onto the gel is sufficient to yield a final calcined catalyst having a catalytically effective amount of metals present. Typically, the times for reslurry will range from about 0.5 to about 2 hours. Optionally, the resulting material can be washed to remove unadsorbed metals and filtered in routine fashion.

Following the reslurry step, the material may be extruded and then dried and calcined; dried, mulled with addition of water, extruded or pelleted and calcined; or partially dried, extruded or pelleted, dried more completely and calcined. Drying is accomplished by conventional means. It may be carried out by forced draft drying, vacuum drying, air dring or similar means. Drying temperatures are not critical and depend upon the particular means utilized for drying. Drying temperatures will typically range from about 50° C. to about 150° C.

In a preferred embodiment, the material is extruded and then dried. Alternatively, the material may be extruded after drying to the proper loss on ignition (LOI). However, to facilitate extrusion, organic binders and/or lubricants may be added prior to extrusion.

After drying, the material is calcined to produce the finished catalyst. The material may be calcined in any atmosphere, reducing, oxidizing or neutral, although air is preferred. However, if binders and/or lubricants are used the material is heated in an oxygen-containing atmosphere, preferably air, in order to burn out the binders and lubricants. Calcining temperatures will typically range from about 300° C. to about 900° C. Burn-out temperatures will depend on the concentration of oxygen in the burn-out atmosphere as well as the burn-out time involved. Typically, burn-out temperatues will range from about 300° C. to about 900° C. Dring, calcining and burn-out may be combined in one or two steps. Most frequently the calcining and/or burn-out steps are combined using an oxygen-containing atmosphere.

Certain other processing steps may be incorporated into the above-described procedure without deviating from the scope and intent of this invention. For example, prior to the complete drying of the catalyst, it may be extruded and then dried more completely, followed by calcination.

The final catalysts are found to have surface areas greater than about 300 m²g, pore volumes ranging from about 0.6 to about 1.2 cc/g and with at least 20% of its pore volume having diameters above about 150 Å. Pore diameters are also measured by mercury intrusion. Crush strengths are greater than about 9 lbs. In general, the metals contents of the final catalysts range from about 1%w to about 5%w nickel and/or cobalt, preferably from about 2.5%w to about 4%w nickel and/or cobalt, from about 8%w to about 18%w molybdenum or about 10%w to about 32%w tungsten, and from about 1%w to about 6%w phosphorus.

The catalysts prepared in the instant invention can be suitably applied to hydrocarbon conversion processes such as catalytic cracking, hydrocracking, hydrotreating, isomerization, hydrogenation, dehydrogenation, oligomerization, alkylation, dealkylation and the like. The catalysts are particularly suitable for demetallization involving crude feedstocks. The larger pores of the instant catalysts are not quickly plugged up and hence provide a longer life.

A typical hydroconversion process utilizing the catalyst of the instant invention will be carried out at a temperature ranging from about 300° F. to about 850° F., a pressure ranging from about 200 psig to about 2500 psig and a liquid hourly space velocity of about 0.1 to about 10.0 reciprocal hour.

The process for preparing the catalysts of the instant invention will be further described below by the following examples which are provided for illustration and which are not to be construed as limiting the invention.

EXAMPLE 1

Seven hundred and forty grams of reagent grade sodium aluminate were added to 1000 grams of water which was then heated to 60° C. in order to effect dissolution of the materials. Five hundred and forty-four grams of aluminum chloride hexahydrate were added to 760 grams of water. One hundred and twelve grams of 85% phosphoric acid along with 112 grams of water were added to the aluminum chloride solution which was then heated to 60° C. Both solutions were cooled to slightly less than 60° C. and placed in dropping funnels.

Five liters of a 40% by volume ethanol solution was added to a 10 liter stainless steel bucket equipped with a pH meter, thermometer and stirrer, to serve as the heel. After the pH of the heel was adjusted to 7.0 using the sodium aluminate solution, the two solutions in the dropping funnels were added simultaneously to the well-stirred bucket, maintaining a precipitation pH of 7. A total of 1370 grams of sodium aluminate solution and 761 grams of aluminum chloride solution were used to effect the titration. After these quantities of reagents had been used, the final aging pH of the solution rose to between 10.0 and 11.0. The solution was aged for one hour at 60° C. The resulting material was filtered and washed in two large Buchner funnels with about 50 liters of water. The excess water from the wet filter cake was removed by vacuum. The hydrogel was then divided into three equal portions.

The following solutions were then prepared. 30.57 grams of nickel nitrate as hexahydrate was mixed with 21.53 grams of 85% phosphoric acid and diluted to 500 milliliters with water. An additional solution of 45.39 grams of ammonium heptamolybdate and 7.07 grams of 30% hydrogen peroxide were diluted to 500 milliliters with water. The two solutions were combined slowly with stirring and one portion of the hydrogel was added and reslurried with the solution at 80° C. for two hours at a pH of 5.0. At the end of two hours, the slurry was filtered and washed with two liters of water. The excess water from the slurry was again removed by vacuum. The wet gel was then extruded using a small, hand-held extruder using a 0.156" cylindrical die, dried overnight at 120° C. and calcined in air at 510° C. The properties of the catalyst are listed in Tables I and II.

EXAMPLE 2

A catalyst was prepared according to Example 1 except that the molybdenum solution contained 4 g of monoethanolamine and the pH of the reslurry was 5.5. The properties of the final catalyst are listed in Tables I and II.

COMPARATIVE EXPERIMENT A

Seven hundred and forty grams of reagent grade sodium aluminate were added to 1000 grams of water which was then heated to 60° C. in order to effect solution of the materials. Five hundred and forty-three grams of aluminum chloride hexahydrate were added to 760 grams of water. One hundred and twelve grams of 85% phosphoric acid along with 112 grams of water were added to the aluminum chloride solution which was then heated to 60° C. Both solutions were cooled to slightly less than 60° C. and placed in dropping funnels.

Five thousand grams of water were added to a 10 liter stainless steel bucket equipped with a pH meter, thermometer and stirrer, to serve as the heel. After the pH of the heel was adjusted to 7.0 using the sodium aluminate solution, the two solutions in the dropping funnels were added simultaneously to the well-stirred bucket, maintaining a precipitation pH of 7. A total of 1370 grams of sodium aluminate solution and 761 grams of aluminum chloride solution were used to effect the titration. After these quantities of reagent had been used, the final aging pH of the solution rose to between 10.0 and 11.0. The solution was aged for one hour at 60° C. The resulting material was filtered and washed in two large Buchner funnels with about 50 liters of water. The excess water from the wet filter cake was removed by vacuum. The hydrogel was then extruded using a small, hand-held extruder using a 0.156" cylindrical die, dried overnight at 120° C. and calcined in air at 510° C. The properties of the carrier are listed in Tables I and II.

COMPARATIVE EXPERIMENT B

Seven hundred and forty grams of reagent grade sodium aluminate were added to 1000 grams of water which was then heated to 60° C. in order to effect solution of the materials. Five hundred and forty-two grams of aluminum chloride hexahydrate were added to 760 grams of water. One hundred and twelve grams of 85% phosphoric acid along with 112 grams of water were added to the aluminum chloride solution which was then heated to 60° C. Both solutions were cooled to slightly less than 60° C. and placed in dropping funnels.

Five thousand grams of water were added to a 10 liter stainless steel bucket equipped with a pH meter, thermometer and stirrer, to serve as the heel. After the pH of the heel was adjusted to 7.0 using the sodium aluminate solution, the two solutions in the dropping funnels were added simultaneously to the well-stirred bucket, maintaining a precipitation pH of 7. A total of 1370 grams of sodium aluminate solution and 761 grams of aluminum chloride solution were used to effect the titration. After these quantities of reagents had been used, the final aging pH of the solution rose to between 10.0 and 11.0. The solution was aged for one hour at 60° C. The resulting material was filtered and washed in two large Buchner funnels with about 50 liters of water. The excess water from the wet filter cake was removed by vacuum. The hydrogel was then divided into three equal portions.

The following solutions were then prepared. 30.57 grams of nickel nitrate as hexahydrate was mixed with 21.53 grams of 85% phosphoric acid and diluted to 500 milliliters with water. An additional solution of 45.39 grams of ammonium heptamolybdate and 7.07 grams of 30% hydrogen peroxide were diluted to 500 milliliters with water. The two solutions were combined slowly with stirring and one portion of the hydrogel was added and reslurried with the solution at 80° C. for two hours at a pH of 4.5. At the end of two hours, the slurry was filtered and washed with two liters of water. The excess water from the slurry was again removed by vacuum. The wet gel was then extruded using a small, hand-held extruder using a 0.156" cylindrical die, dried overnight at 120° C. and calcined in air at 510° C. The properties of the catalyst are listed in Tables I and II.

COMPARATIVE EXPERIMENT C

Seven hundred and forty grams of reagent grade sodium aluminate were added to 1000 grams of water which was then heated to 60° C. in order to effect solution of the materials. Five hundred and forty-four grams of aluminum chloride hexahydrate were added to 760 grams of water. One hundred and twelve grams of 85% phosphoric acid along with 112 grams of water were added to the aluminum chloride solution which was then heated to 60° C. Both solutions were cooled to slightly less than 60° C. and placed in dropping funnels.

Five liters of a 40% by volume ethanol solution was added to a 10 liter stainless steel bucket equipped with a pH meter, thermometer and stirrer, to serve as the heel. After the pH of the heel was adjusted to 7.0 using the sodium aluminate solution, the two solutions in the dropping funnels were added simultaneously to the well-stirred bucket, maintaining a precipitation pH of 7. A total of 1370 grams of sodium aluminate solution and 761 grams of aluminum chloride solution were used to effect titration. After these quantities of reagents had been used, the final aging pH of the solution rose to between 10.0 and 11.0. The solution was aged for one hour at 60° C. The resulting material was filtered and washed in two large Buchner funnels with about 50 liters of water. The excess water from the wet filter cake was removed by vacuum. The hydrogel was then extruded using a small, hand-held extruder using a 0.156" cylindrical die, dried overnight at 120° C. and calcined in air at 510° C. The properties of the carrier are listed in Tables I and II.

COMPARATIVE EXPERIMENT D

Five hundred and eighty-two grams of reagent grade sodium aluminate were added to 787 grams of water which was then heated to 60° C. in order to effect solution of the materials. Two hundred and seventy-one grams of aluminum chloride hexahydrate were added to 380 grams of water. Fifty-six grams of 85% phosphoric acid along with 56 grams of water were added to the aluminum chloride solution which was then heated to 60° C. Both solutions were cooled to slightly less than 60° C. and placed in dropping funnels.

Five liters of a 40% by volume isopropanol solution was added to a 10 liter stainless steel bucket equipped with a pH meter, thermometer and stirrer, to serve as the heel. After the pH of the heel was adjusted to 7.0 using the sodium aluminate solution, the two solutions in the dropping funnels were added simultaneously to the well-stirred bucket, maintaining a precipitation pH of 7. A total of 1370 grams of sodium aluminate solution and 761 grams of aluminum chloride solution were used to effect titration. After these quantities of reagents had been used, the final aging pH of the solution rose to between 10.0 and 11.0. The solution was aged for one hour at 60° C. The resulting material was filtered and washed in two large Buchner funnels with about 50 liters of water. The excess water from the wet filer cake was removed by vacuum. The hydrogel was then divided into three equal portions.

The following solutions were prepared. 21.54 grams of nickel nitrate as hexahydrate was mixed with 15.12 grams of 85% phosphoric acid and diluted to 500 milliliters with water. An additional solution of 32.01 grams of ammonium heptamolybdate and 4.5 grams of 30% hydrogen peroxide were diluted to 500 milliliters with water. The two solutions were combined slowly with stirring and one portion of the hydrogel was added and reslurried with the solution at 80° C. for two hours at a pH of 5.0. At the end of two hours, the slurry was filtered and washed with two liters of water. The excess water from the slurry was again removed by vacuum. The wet gel was then extruded using a small, hand-held extruder using a 0.156" cylindrical die, dried overnight at 120° C. and calcined in air at 510° C. The properties of the catalyst are listed in Tables I and II.

COMPARATIVE EXPERIMENT E

A catalyst was prepared according to Comparative Experiment D, except that a 10% by volume ethanol solution was used as a heel. The properties of the catalyst are listed in Tables I and II.

As can be seen in Tables I and II, the catalysts prepared in Examples 1 and 2 show an increase in the number of macropores while maintaining high surface areas. As evidenced by Comparative Experiment B, however, this increase in the number of macropores cannot be attributed to the amount of phosphorus present in the catalysts.

Comparative Experiments A and C show that the presence of alcohol in the support has no effect on the pore size distribution of the support materials. It is only when the metals solutions are added that an increase in macropores is seen. Comparative Experiments D and E are included to show that the type and amount of alcohol utilized are critical to the formation of products having more than about 20% of their pores greater than about 150 Å.

TABLE I

| Catalyst And Carrier Properties | | | | | | | |
|---|---|---|---|---|---|---|---|
| | EXAMPLE 1 w/alcohol | EXAMPLE 2 w/alcohol & MEA | COMPARATIVE EXPERIMENT A w/o alcohol | COMPARATIVE EXPERIMENT B w/o alcohol | COMPARATIVE EXPERIMENT C w/alcohol | COMPARATIVE EXPERIMENT D w/alcohol | COMPARATIVE EXPERIMENT E w/alcohol |
| Density g/cc[a] | 0.51 | 0.51 | 0.73 | 0.68 | 0.77 | 0.72 | 0.57 |
| $N_2$ Surface Area $m^2/g$[b] | 418.0 | 426.0 | 365.0 | 431.0 | 387.0 | 413.0 | 458.0 |
| $N_2$ Pore Volume cc/g[c] | 0.74 | 0.79 | 0.48 | 0.58 | 0.47 | 0.52 | 0.71 |
| Flat Plate Crush Strength lbs.[d] | 10.0 | 12.0 | 30.0 | 22.0 | 19.0 | 17.0 | 14.0 |
| % wt. Nickel[e] | 3.1 | 3.7 | — | 3.1 | — | 2.0 | 2.2 |
| % wt. Molybdenum[f] | 11.6 | 11.2 | — | 11.9 | — | 8.8 | 7.9 |
| % wt. Phosphorus[g] | 5.3 | 4.7 | 2.0 | 5.5 | 1.5 | 3.6 | 4.9 |
| Alcohol (%) | ETOH (40%) | ETOH (40%) | — | — | ETOH (40%) | IPA (40%) | ETOH (10%) |

TABLE II

| Catalyst And Carrier Pore Size Distributions | | | | | | | |
|---|---|---|---|---|---|---|---|
| Hg Pore[h] Size Dist | EXAMPLE 1 | EXAMPLE 2 | COMPARATIVE EXPERIMENT A | COMPARATIVE EXPERIMENT B | COMPARATIVE EXPERIMENT C | COMPARATIVE EXPERIMENT D | COMPARATIVE EXPERIMENT E |
| <50 ang | 29.1 | 28.8 | 92.5 | 85.3 | 90.7 | 86.7 | 64.7 |
| 50–70 ang | 20.1 | 20.7 | 2.2 | 5.7 | 2.3 | 4.0 | 23.2 |
| 70–100 ang | 9.6 | 9.5 | 1.6 | 2.9 | 2.5 | 2.5 | 4.9 |
| 100–150 ang | 7.8 | 7.4 | 1.7 | 2.2 | 2.5 | 2.1 | 1.3 |
| 150–350 ang | 18.2 | 20.4 | 1.5 | 2.4 | 1.2 | 2.7 | 2.8 |
| >350 ang | 15.3 | 13.2 | 0.5 | 1.5 | 0.8 | 2.1 | 3.1 |

[a] 209 cc volume fully settled in a graduated cup and weighed.
[b] BET, by nitrogen adsorption/desorption, Micromeritics Digisorb 2500 Instrument.
[c] By nitrogen adsorption, Micromeritics Digisorb 2500 Instrument.
[d] Flat plate, single pellet, extrudate approximately 5 mm in length.
[e] Weight percent determined by neutron activation analysis or atomic absorption spectroscopy.
[f] Weight percent determined by neutron activation analysis or atomic absorption spectroscopy.
[g] Weight percent determined by neutron activation analysis or atomic absorption spectroscopy.
[h] Determined by mercury intrusion, to 60,000 psi using a Micromeritics Autopore 9210, using a 130° contact angle and 0.473 N/m surface tension of mercury. Numbers listed are percent pore volume.

I claim as my invention:

1. A process for hydrotreating metals-containing crude oil feedstocks by contacting said feedstocks at a temperature in the range of from about 300° F. to about 850° F. and a pressure in the range of from about 200 psig to about 2500 psig with a hydrotreating catalyst which has a surface area above about 300 m²/g and at least about 20% of its pore volume in pores having diameters greater than about 150 Å, wherein said catalyst is prepared by a process which comprises:

(a) precipitating an aqueous solution of one or more aluminum salt(s) in the presence of a phosphorus-containing compound in an amount of from about 0.06 to about 0.30 moles of phosphorus per mole of aluminum in an aqueous solution containing about 15%v to about 50%v of an alcohol selected from the group consisting of methanol, ethanol and mixtures thereof, by adjusting the pH of said solution to a range between about 5.5 and about 10.0, (b) aging the precipitate at a temperature ranging from about 20° C. to about 90° C. for at least about 15 minutes at a pH ranging from about 9.0 to about 12.0, (c) washing the precipitate, (d) mixing the precipitate with a solution containing solubilized salts of a heavy metal selected from the group consisting of molybdenum, tungsten and mixtures thereof, and an element selected from the group consisting of nickel, cobalt and mixtures thereof, at a pH in the range between about 4.0 and about 8.0 and a temperature in the range between about 20° C. and about 90° C. until adsorption of said salts onto the gel is sufficient to yield a final catalyst having a catalytically effective amount of metals present, (e) extruding the product of step (d), and (f) drying and calcining the product of step (e) at a temperature ranging from about 300° C. to about 900° C.

2. The process of claim 1 wherein said aqueous solution in step (a) contains about 20%v to about 40%v of an alcohol selected from the group consisting of methanol, ethanol and mixtures thereof.

3. The process of claim 1 wherein the precipitation is carried out at a pH in the range between about 5.5 and about 8.0.

4. The process of claim 1 wherein the precipitation is carried out at a temperature between about 20° C. and about 90° C.

5. The process of claim 4 wherein the precipitation is carried out at a temperature between about 50° C. and about 85° C.

6. The process of claim 1 wherein the aging pH is in the range between about 10.0 and about 11.5.

7. The process of claim 1 wherein said solution in step (d) contains solubilized salts of nickel and molybdenum.

8. The process of claim 1 wherein said solution in step (d) contains solubilized salts of cobalt and molybdenum.

9. The process of claim 7 wherein said catalyst contains from about 1%w to about 5%w nickel and from about 8%w to about 18%w molybdenum.

10. The process of claim 7 wherein said solution in step (d) additionally contains a phosphorus-containing compound in an amount of from about 0.2 to about 1.5 moles of phosphorus per mole of molybdenum.

11. The process of claim 8 wherein said catalyst contains from about 1%w to about 5%w cobalt and from about 8%w to about 18%w molybdenum.

12. The process of claim 8 wherein said solution in step (d) additionally contains a phosphorus-containing compound in an amount of from about 0.2 to about 1.5 moles of phosphorus per mole of molybdenum.

13. The process of claim 1 wherein said solution in step (d) additionally contains a phosphorus-containing compound in an amount of from about 0.2 to about 1.5 moles of phosphorus per mole of heavy metal.

14. A process for hydrotreating metals-containing crude oil feedstocks by contacting said feedstocks at a temperature in the range of from about 300° F. to about 850° F. and a pressure in the range of from about 200 psig to about 2500 psig with a hydrotreating catalyst which has a surface area above about 300 m²/g and at least about 20% of its pore volume in pores having diameters greater than about 150 Å, wherein said catalyst is prepared by a process which comprises:

(a) titrating an aqueous solution of an acid aluminum salt and an aqueous solution of a basic aluminum compound in the presence of a phosphorus-containing compound in an amount of from about 0.06 to about 0.30 moles of phosphorus per mole of aluminum in an aqueous solution containing about 15%v to about 50%v of an alcohol selected from the group consisting of methanol, ethanol and mixtures thereof, thereby forming a precipitate, (b) aging the precipitate at a temperature ranging from about 20° C. to about 90° C. for at least about 15 minutes at a pH ranging from about 9.0 to about 12.0, (c) washing the precipitate, (d) mixing the precipitate with a solution containing solubilized salts of a heavy metal selected from the group consisting of molybdenum, tungsten and mixtures thereof, and an element selected from the group consisting of nickel, cobalt and mixtures thereof, at a pH in the range between about 4.0 and about 8.0 and a temperature in the range between about 20° C. and about 90° C. until adsorption of said salts onto the gel is sufficient to yield a final catalyst having a catalytically effective amount of metals present, (e) extruding the product of step (d), and (f) drying and calcining the product of step (e) at a temperature ranging from about 300° to about 900° C.

15. The process of claim 14 wherein said aqueous solution in step (a) contains about 20%v to about 40%v of an alcohol selected from the group consisting of methanol, ethanol and mixtures thereof.

16. The process of claim 14 wherein the precipitation is carried out at a pH in the range between about 5.5 and about 10.0.

17. The process of claim 16 wherein the precipitation is carried out at a pH in the range between about 5.5 and about 8.0.

18. The process of claim 14 wherein the precipitation is carried out at a temperature between about 20° C. and about 90° C.

19. The process of claim 18 wherein the precipitation is carried out at a temperature between about 50° C. and about 85° C.

20. The process of claim 14 wherein the aging pH is in the range between about 10.0 and about 11.5.

21. The process of claim 14 wherein said solution in step (d) contains solubilized salts of nickel and molybdenum.

22. The process of claim 14 wherein said solution in step (d) contains solubilized salts of cobalt and molybdenum.

23. The process of claim 21 wherein said catalyst contains from about 1%w to about 5%w nickel and from about 8%w to about 18%w molybdenum.

24. The process of claim 21 wherein said solution in step (d) additionally contains a phosphorus-containing compound in an amount of from about 0.2 to about 1.5 moles of phosphorus per mole of molybdenum.

25. The process of claim 22 wherein said catalyst contains from about 1%w to about 5%w cobalt and from about 8%w to about 18%w molybdenum.

26. The process of claim 22 wherein said solution in step (d) additionally contains a phosphorus-containing compound in an amount of from about 0.2 to about 1.5 moles of phosphorus per mole of molybdenum.

27. The process of claim 14 wherein said solution in step (d) additionally contains a phosphorus-containing compound in an amount of from about 0.2 to about 1.5 moles of phosphorus per mole of heavy metal.

28. A process for hydrotreating metals-containing crude oil feedstocks by contacting said feedstocks at a temperature in the range of from about 300° F. to about 850° F. and a pressure in the range of from about 200 psig to about 2500 psig with a hydrotreating catalyst which has a surface area above about 300 m$^2$/g and at least about 20% of its pore volume in pores having diameters greater than about 150 Å, wherein said catalyst is prepared by a process which comprises:
  (a) titrating an aqueous solution of an acid aluminum salt and phosphoric acid in an amount of from about 0.06 to about 0.30 moles of phosphorus per mole of aluminum with an aqueous solution of a basic aluminum compound in an aqueous solution containing about 15%v to about 50%v of an alcohol selected from the group consisting of methanol, ethanol and mixtures thereof, thereby forming a precipitate,
  (b) aging the precipitate at a temperature ranging from about 20° C. to about 90° C. for at least about 15 minutes at a pH ranging from about 9.0 to about 12.0,
  (c) washing the precipitate,
  (d) mixing the precipitate with a solution containing solubilized salts of a heavy metal selected from the group consisting of molybdenum, tungsten and mixtures thereof, and an element selected from the group consisting of nickel, cobalt and mixtures thereof, at a pH in the range between about 4.0 and about 8.0 and a temperature in the range between about 20° C. and about 90° C. until adsorption of said salts onto the gel is sufficient to yield a final catalyst having a catalytically effective amount of metals present,
  (e) extruding the product of step (d), and
  (f) drying and calcining the product of step (e) at a temperature ranging from about 300° C. to about 900° C.

29. The process of claim 28 wherein said aqueous solution in step (a) contains about 20% v to about 40%v of an alcohol selected from the group consisting of methanol, ethanol and mixtures thereof.

30. The process of claim 28 wherein the precipitation is carried out at a pH in the range between about 5.5 and about 10.0.

31. The process of claim 30 wherein the precipitation is carried out at a pH in the range between about 5.5 and about 8.0.

32. The process of claim 28 wherein the precipitation is carried out at a temperature between about 20° C. and about 90° C.

33. The process of claim 32 wherein the precipitation is carried out at a temperature between about 50° C. and about 85° C.

34. The process of claim 28 wherein the aging pH is in the range between about 10.0 and about 11.5.

35. The process of claim 28 wherein said solution in step (d) contains solubilized salts of nickel and molybdenum.

36. The process of claim 28 wherein said solution in step (d) contains solubilized salts of cobalt and molybdenum.

37. The process of claim 35 wherein said catalyst contains from about 1%w to about 5%w nickel and from about 8%w to about 18%w molybdenum.

38. The process of claim 35 wherein said solution in step (d) additionally contains a phosphorus-containing compound in an amount of from about 0.2 to about 1.5 moles of phosphorus per mole of molybdenum.

39. The process of claim 36 wherein said catalyst contains from about 1%w to about 5%w cobalt and from about 8%w to about 18%w molybdenum.

40. The process of claim 36 wherein said solution in step (d) additionally contains a phosphorus-containing compound in an amount of from about 0.2 to about 1.5 moles of phosphorus per mole of molybdenum.

41. The process of claim 28 wherein said solution in step (d) additionally contains a phosphorus-containing compound in an amount of from about 0.2 to about 1.5 moles of phosphorus per mole of heavy metal.

42. A process for hydrotreating metals-containing crude oil feedstocks by contacting said feedstocks at a temperature in the range of from about 300° F. to about 850° F. and a pressure in the range of from about 200 psig to about 2500 psig with a hydrotreating catalyst which has a surface area above about 300 m$^2$/g and at least about 20% of its pore volume in pores having diameters greater than about 150 Å, wherein said catalyst is prepared by a process which comprises:
  (a) titrating an aqueous solution of an acid aluminum salt with an aqueous solution of a basic aluminum compound and sodium phosphate in an amount of from about 0.06 to about 0.30 moles of phosphorus per mole of aluminum in an aqueous solution containing about 15%v to about 50%v of an alcohol selected from the group consisting of methanol, ethanol and mixtures thereof, thereby forming a precipitate,
  (b) aging the precipitate at a temperature ranging from about 20° C. to about 90° C. for at least about 15 minutes at a pH ranging from about 9.0 to about 12.0,
  (c) washing the precipitate,
  (d) mixing the precipitate with a solution containing solubilized salts of a heavy metal selected from the group consisting of molybdenum, tungsten and mixtures thereof, and an element selected from the group consisting of nickel, cobalt and mixtures thereof, at a pH in the range between about 4.0 and about 8.0 and a temperature in the range between about 20° C. and about 90° C. until adsorption of said salts onto the gel is sufficient to yield a final catalyst having a catalytically effective amount of metals present,
  (e) extruding the product of step (d), and
  (f) drying and calcining the product of step (e) at a temperature ranging from about 300° C. to about 900° C.

43. The process of claim 42 wherein said aqueous solution in step (a) contains about 20%v to about 40%v of an alcohol selected from the group consisting of methanol, ethanol and mixtures thereof.

44. The process of claim 42 wherein the precipitation is carried out at a pH in the range between about 5.5 and about 10.0.

45. The process of claim 44 wherein the precipitation is carried out at a pH in the range between about 5.5 and about 8.0.

46. The process of claim 42 wherein the precipitation is carried out at a temperature between about 20° C. and about 90° C.

47. The process of claim 46 wherein the precipitation is carried out at a temperature between about 50° C. and about 85° C.

48. The process of claim 42 wherein the aging pH is in the range between about 10.0 and about 11.5.

49. The process of claim 42 wherein said solution in step (d) contains solubilized salts of nickel and molybdenum.

50. The process of claim 42 wherein said solution in step (d) contains solubilized salts of cobalt and molybdenum.

51. The process of claim 49 wherein said catalyst contains from about 1%w to about 5%w nickel and from about 8%w to about 18%w molybdenum.

52. The process of claim 49 wherein said solution in step (d) additionally contains a phosphorus-containing compound in an amount of from about 0.2 to about 1.5 moles of phosphorus per mole of molybdenum.

53. The process of claim 50 wherein said catalyst contains from about 1%w to about 5%w cobalt and from about 8%w to about 18%w molybdenum.

54. The process of claim 50 wherein said solution in step (d) additionally contains a phosphorus-containing compound in an amount of from about 0.2 to about 1.5 moles of phosphorus per mole of molybdenum.

55. The process of claim 42 wherein said solution in step (d) additionally contains a phosphorus-containing compound in an amount of from about 0.2 to about 1.5 moles of phosphorus per mole of heavy metal.

56. A process for hydrotreating metals-containing crude oil feedstocks by contacting said feedstocks at a temperature in the range of from about 300° F. to about 850° F. and a pressure in the range of from about 200 psig to about 2500 psig with a hydrotreating catalyst which has a surface area above about 300 m$^2$/g and at least about 20% of its pore volume in pores having diameters greater than about 150 Å, wherein said catalyst is prepared by a process which comprises:
 (a) titrating an aqueous solution of an acid aluminum salt selected from the group consisting of aluminum sulfate, aluminum nitrate and aluminum chloride, and an aqueous solution of a basic aluminum compound selected from the group consisting of sodium aluminate and potassium aluminate, in the presence of a phosphorus-containing compound in an amount of from about 0.06 to about 0.30 moles of phosphorus per mole of aluminum in an aqueous solution containing about 20%v to about 40%v of an alcohol selected from the group consisting of methanol, ethanol and mixtures thereof, thereby forming a precipitate,
 (b) aging the precipitate at a temperature ranging from about 20° C. to about 90° C. for at least about 15 minutes at a pH ranging from about 10.0 to about 11.5,
 (c) washing the precipitate,
 (d) mixing the precipitate with a solution containing solubilized molybdate or dimolybdate salts and nickel salts, and phosphoric acid in an amount of from about 0.2 to about 1.5 moles of phosphorus per mole of molybdenum, at a pH in the range between about 4.0 and about 6.0 and a temperature in the range between about 20° C. and about 90° C. until adsorption of said salts onto the gel is sufficient to yield a final catalyst having from about 2.5%w to about 4%w nickel and from about 10%w to about 14%w molybdenum,
 (e) extruding the product of step (d), and
 (f) drying and calcining the product of step (e) at a temperature ranging from about 300° C. to about 900° C.

57. A process for hydrotreating metals-containing crude oil feedstocks by contacting said feedstocks at a temperature in the range of from about 300° F. to about 850° F. and a pressure in the range of from about 200 psig to about 2500 psig with a hydrotreating catalyst which has a surface area above about 300 m$^2$/g and at least about 20% of its pore volume in pores having diameters greater than about 150 Å, wherein said catalyst is prepared by a process which comprises:
 (a) titrating an aqueous solution of an acid aluminum salt selected from the group consisting of aluminum sulfate, aluminum nitrate and aluminum chloride, and an aqueous solution of a basic aluminum compound selected from the group consisting of sodium aluminate and potassium aluminate, in the presence of a phosphorus-containing compound in an amount of from about 0.06 to about 0.30 moles of phosphorus per mole of aluminum in an aqueous solution containing about 20%v to about 40%v of an alcohol selected from the group consisting of methanol, ethanol and mixtures thereof, thereby forming a precipitate,
 (b) aging the precipitate at a temperature ranging from about 20° C. to about 90° C. for at least about 15 minutes at a pH ranging from about 10.0 to about 11.5,
 (c) washing the precipitate,
 (d) mixing the precipitate with a solution containing solubilized molybdate or dimolybdate salts and cobalt salts, and phosphoric acid in an amount of from about 0.2 to about 1.5 moles of phosphorus per mole of molybdenum, at a pH in the range between about 4.0 and about 6.0 and a temperature in the range between about 20° C. and about 90° C. until adsorption of said salts onto the gel is sufficient to yield a final catalyst having from about 2.5%w to about 4%w cobalt and from about 10%w to about 14%w molybdenum,
 (e) extruding the product of step (d), and
 (f) drying and calcining the product of step (e) at a temperature ranging from about 300° C. to about 900° C.

58. A process for hydrotreating metals-containing crude oil feedstocks by contacting said feedstocks at a temperature in the range of from about 300° F. to about 850° F. and a pressure in the range of from about 200 psig to about 2500 psig with a hydrotreating catalyst which has a surface area above about 300 m$^2$/g and at least about 20% of its pore volume in pores having diameters greater than about 150 Å, wherein said catalyst is prepared by a process which comprises:

(a) precipitating an aqueous solution of an acid aluminum salt selected from the group consisting of aluminum sulfate, aluminum nitrate and aluminum chloride, with an aqueous solution of a base in the presence of a phosphorus-containing compound in an amount of from about 0.06 to about 0.30 moles of phosphorus per mole of aluminum in an aqueous solution containing about 20%v to about 40%v of an alcohol selected from the group consisting of methanol, ethanol and mixtures thereof, (b) aging the precipitate at a temperature ranging from about 20° C. to about 90° C. for at least about 15 minutes at a pH ranging from about 10.0 to about 11.5, (c) washing the precipitate, (d) mixing the precipitate with a solution containing solubilized molybdate or dimolybdate salts and nickel salts, and phosphoric acid in an amount of from about 0.2 to about 1.5 moles of phosphorus per mole of molybdenum, at a pH in the range between about 4.0 and about 6.0 and a temperature in the range between about 20° C. and about 90° C. until adsorption of said salts onto the gel is sufficient to yield a final catalyst having from about 2.5%w to about 4%w nickel and from about 10%w to about 14%w molybdenum, (e) extruding the product of step (d), and (f) drying and calcining the product of step (e) at a temperature ranging from about 300° C. to about 900° C.

59. A process for hydrotreating metals-containing crude oil feedstocks by contacting said feedstocks at a temperature in the range of from about 300° F. to about 850° F. and a pressure in the range of from about 200 psig to about 2500 psig with a hydrotreating catalyst which has a surface area above about 300 m²/g and at at least about 20% of its pore volume in pores having diameters greater than about 150 Å, wherein said catalyst is prepared by a process which comprises:

(a) precipitating an aqueous solution of an acid with an aqueous solution of a basic aluminum compound selected from the group consisting of sodium aluminate and potassium aluminate, in the presence of a phosphorus-containing compound in an amount of from about 0.06 to about 0.30 moles of phosphorus per mole of aluminum in an aqueous solution containing about 20%v to about 40%v of an alcohol selected from the group consisting of methanol, ethanol and mixtures thereof, (b) aging the precipitate at a temperature ranging from about 20° C. to about 90° C. for at least about 15 minutes at a pH ranging from about 10.0 to about 11.5, (c) washing the precipitate, (d) mixing the precipitate with a solution containing solubilized molybdate or dimolybdate salts and nickel salts, and phosphoric acid in an amount of from about 0.2 to about 1.5 moles of phosphorus per mole of molybdenum, at a pH in the range between about 4.0 and about 6.0 and a temperature in the range between about 20° C. and about 90° C. until adsorption of said salts onto the gel is sufficient to yield a final catalyst having from about 2.5%w to about 4%w nickel and from about 10%w to about 14%w molybdenum, (e) extruding the product of step (d), and (f) drying and calcining the product of step (e) at a temperature ranging from about 300° C. to about 900° C.

60. A process for hydrotreating metals-containing crude oil feedstocks by contacting said feedstocks at a temperature in the range of from about 300° F. to about 850° F. and a pressure in the range of from about 200 psig to about 2500 psig with a hydrotreating catalyst which has a surface area above about 300 m²/g and at least about 20% of its pore volume in pores having diameters greater than about 150 Å, wherein said catalyst is prepared by a process which comprises:

(a) precipitating an aqueous solution of an acid with an aqueous solution of a basic aluminum compound selected from the group consisting of sodium aluminate and potassium aluminate, in the presence of a phosphorus-containing compound in an amount of from about 0.06 to about 0.30 moles of phosphorus per mole of aluminum in an aqueous solution containing about 20%v to about 40%v of an alcohol selected from the group consisting of methanol, ethanol and mixtures thereof, (b) aging the precipitate at a temperature ranging from about 20° C. to about 90° C. for at least about 15 minutes at a pH ranging from about 10.0 to about 11.5, (c) washing the precipitate, (d) mixing the precipitate with a solution containing solubilized molybdate or dimolybdate salts and cobalt salts, and phosphoric acid in an amount of from about 0.2 to about 1.5 moles of phosphorus per mole of molybdenum, at a pH in the range between about 4.0 and about 6.0 and a temperature in the range between about 20° C. and about 90° C. until adsorption of said salts onto the gel is sufficient to yield a final catalyst having from about 2.5%w to about 4%w cobalt and from about 10%w to about 14%w molybdenum, (e) extruding the product of step (d), and (f) drying and calcining the product of step (e) at a temperature ranging from about 300° C. to about 900° C.

61. A process for hydrotreating metals-containing crude oil feedstocks by contacting said feedstocks at a temperature in the range of from about 300° F. to about 850° F. and a pressure in the range of from about 200 psig to about 2500 psig with a hydrotreating catalyst which has a surface area above about 300 m²/g and at least about 20% of its pore volume in pores having diameters greater than about 150 Å, wherein said catalyst is prepared by a process which comprises:

(a) precipitating an aqueous solution of an acid aluminum salt selected from the group consisting of aluminum sulfate, aluminum nitrate and aluminum chloride, with an aqueous solution of a base in the presence of a phosphorus-containing compound in an amount of from about 0.06 to about 0.30 moles of phosphorus per mole of aluminum in an aqueous solution containing about 20%v to about 40%v of an alcohol selected from the group consisting of methanol, ethanol and mixtures thereof, (b) aging the precipitate at a temperature ranging from about 20° C. to about 90° C. for at least about 15 minutes at a pH ranging from about 10.0 to about 11.5, (c) washing the precipitate, (d) mixing the precipitate with a solution containing solubilized molybdate or dimolybdate salts and cobalt salts, and phosphoric acid in an amount of from about 0.2 to about 1.5 moles of phosphorus per mole of molybdenum, at a pH in the range between about 4.0 and about 6.0 and a temperature in the range between about 20° C. and about 90° C. until adsorption of said salts onto the gel is sufficient to yield a final catalyst having from about 2.5%w to about 4%w cobalt and from about 10%w to about 14%w molybdenum, (e) extruding the product of step (d), and (f) drying and calcining the product of step (e) at a temperature ranging from about 300° C. to about 900° C.

* * * * *